United States Patent
Phillips et al.

(10) Patent No.: US 10,810,528 B1
(45) Date of Patent: Oct. 20, 2020

(54) IDENTIFYING AND UTILIZING THE AVAILABILITY OF ENTERPRISE RESOURCES

(71) Applicant: Capital One Services, LLC, McLean, VA (US)

(72) Inventors: Jeremy Phillips, Brooklyn, NY (US); Ehab Awadallah, Annandale, VA (US); St. John G. Hill, Reston, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/517,270

(22) Filed: Jul. 19, 2019

(51) Int. Cl.
| G06Q 10/06 | (2012.01) |
| G06N 20/00 | (2019.01) |
| G06Q 20/10 | (2012.01) |
| G06Q 10/10 | (2012.01) |

(52) U.S. Cl.
CPC ....... *G06Q 10/06315* (2013.01); *G06N 20/00* (2019.01); *G06Q 10/1093* (2013.01); *G06Q 20/1085* (2013.01)

(58) Field of Classification Search
None
See application file for complete search history.

(56) References Cited

U.S. PATENT DOCUMENTS

| 8,335,593 | B2 | 12/2012 | Johnson et al. |
| 8,645,495 | B2 | 2/2014 | Johnson et al. |
| 9,965,797 | B1 | 5/2018 | Poole et al. |
| 9,990,636 | B1 * | 6/2018 | Lewis ............... G06Q 30/016 |
| 10,083,411 | B2 * | 9/2018 | Kinsey, II .......... G06Q 30/0627 |
| 10,325,224 | B1 * | 6/2019 | Erenrich ............... G06N 5/04 |

(Continued)

FOREIGN PATENT DOCUMENTS

| CA | 3002232 A1 * | 10/2018 | ............ G06N 5/046 |
| WO | WO-2014078672 A2 * | 5/2014 | ......... G06Q 10/1095 |

OTHER PUBLICATIONS

Soltani, Mohamad, Michele Samorani, and Bora Kolfal. "Appointment scheduling with multiple providers and stochastic service times." European Journal of Operational Research 277.2 (2019): 667-683. (Year: 2019).*

(Continued)

*Primary Examiner* — Thomas L Mansfield
*Assistant Examiner* — Derick J Holzmacher

(57) ABSTRACT

Various embodiments are directed to techniques for organizing fulfillment of enterprise products, such as by using a request manager informed by enterprise resources and resource utilization to recommend a facility to fulfill a product request. Some embodiments are directed to identifying a product request and determining the equipment and skills necessary to fulfill the product request. Based on this information and location data, embodiments may determine a set of facilities as candidates to fulfill the request. A machine learning model may be used to analyze current resource utilization of the facilities and predict facility availability and estimated completion times for the request fulfillment. A candidate facility may be recommended for fulfillment of a request based on facility availability and estimated completion times. In some embodiments, historical resource utilization may be used to inform further staffing and equipment service decisions.

20 Claims, 11 Drawing Sheets

(56) References Cited

U.S. PATENT DOCUMENTS

| | | | |
|---|---|---|---|
| 10,346,003 B2 | 7/2019 | Selfridge et al. | |
| 10,402,760 B2* | 9/2019 | Kinsey, II | G06Q 30/0627 |
| 10,423,911 B2* | 9/2019 | Achtner | H04L 47/70 |
| 2011/0112875 A1 | 5/2011 | Johnson et al. | |
| 2011/0113120 A1 | 5/2011 | Johnson et al. | |
| 2011/0113360 A1 | 5/2011 | Johnson et al. | |
| 2013/0191898 A1 | 7/2013 | Kraft | |
| 2014/0136259 A1* | 5/2014 | Kinsey, II | G06Q 30/0627 705/7.16 |
| 2014/0136264 A1* | 5/2014 | Kinsey, II | G06Q 10/063116 705/7.19 |
| 2014/0136265 A1* | 5/2014 | Kinsey, II | G06Q 10/063116 705/7.19 |
| 2014/0136266 A1* | 5/2014 | Kinsey, II | G06Q 30/0282 705/7.19 |
| 2014/0136373 A1* | 5/2014 | Kinsey, II | G06Q 10/063116 705/26.63 |
| 2014/0136443 A1* | 5/2014 | Kinsey, II | G06Q 30/0627 705/347 |
| 2015/0148078 A1 | 5/2015 | Phillips et al. | |
| 2015/0206252 A1 | 7/2015 | Rephlo et al. | |
| 2015/0379429 A1* | 12/2015 | Lee | G09B 5/00 706/11 |
| 2015/0379430 A1* | 12/2015 | Dirac | G06N 20/00 706/12 |
| 2016/0012411 A1 | 1/2016 | Kursun et al. | |
| 2016/0019640 A1 | 1/2016 | Barnett et al. | |
| 2016/0232546 A1* | 8/2016 | Ranft | G06Q 40/025 |
| 2017/0046638 A1 | 2/2017 | Chan et al. | |
| 2017/0178048 A1 | 6/2017 | Ghotbi et al. | |
| 2017/0235452 A1 | 8/2017 | Selfridge et al. | |
| 2017/0235453 A1 | 8/2017 | Selfridge | |
| 2017/0235454 A1 | 8/2017 | Selfridge et al. | |
| 2017/0250885 A1* | 8/2017 | Donovan | H04L 43/16 |
| 2017/0346710 A1* | 11/2017 | Jones-McFadden | G06Q 10/0639 |
| 2017/0346711 A1* | 11/2017 | Jones-McFadden | G06Q 20/3221 |
| 2017/0364534 A1* | 12/2017 | Zhang | G06F 16/284 |
| 2018/0041447 A1* | 2/2018 | Dintenfass | G06Q 10/063114 |
| 2018/0060122 A1 | 3/2018 | Tang et al. | |
| 2018/0060954 A1 | 3/2018 | Yin et al. | |
| 2018/0088939 A1 | 3/2018 | Strachan et al. | |
| 2018/0150783 A1* | 5/2018 | Xu | G06N 20/00 |
| 2018/0204151 A1* | 7/2018 | Achtner | G06Q 10/0631 |
| 2018/0204159 A1* | 7/2018 | Achtner | H04L 47/70 |
| 2018/0234325 A1 | 8/2018 | Moiyallah, Jr. et al. | |
| 2018/0276710 A1 | 9/2018 | Tietzen et al. | |
| 2018/0285900 A1 | 10/2018 | Bhattacharyya et al. | |
| 2018/0308025 A1* | 10/2018 | Bansal | G06N 3/02 |
| 2018/0374020 A1* | 12/2018 | Ahani | H04W 4/025 |
| 2019/0121889 A1* | 4/2019 | Gold | G06F 16/2255 |
| 2019/0147430 A1* | 5/2019 | Chen | G06Q 20/22 705/40 |
| 2019/0265971 A1* | 8/2019 | Behzadi | G06F 8/10 |
| 2019/0325355 A1 | 10/2019 | Gladwin et al. | |
| 2019/0362083 A1* | 11/2019 | Ortiz | H04L 9/0844 |

OTHER PUBLICATIONS

Eletter, Shorouq Fathi, Saad Ghaleb Yaseen, and Ghaleb Awad Elrefae. "Neuro-based artificial intelligence model for loan decisions." American Journal of Economics and Business Administration 2.1 (2010): 27. (Year: 2010).*

Erdal, Halil Ibrahim, and Aykut Ekinci. "A comparison of various artificial intelligence methods in the prediction of bank failures." Computational Economics 42.2 (2013): 199-215. (Year: 2013).*

* cited by examiner

100

300A

300B

400A

400B

<u>500B</u>

500C

600

700

IDENTIFYING AND UTILIZING THE AVAILABILITY OF ENTERPRISE RESOURCES

BACKGROUND

Enterprise resources may include or refer to devices, skills, techniques, employees, vendors, or the like used by an enterprise to provide enterprise-offered products. An enterprise may refer to an entity or set of entities, such as businesses or companies, that engages in economic activity to provide products such as goods or services. For example, a bank or banking company may be an enterprise, and products offered by a bank may include financial advising, wealth management, safe deposit boxes, savings accounts, money market accounts, current accounts, individual retirement accounts, fixed deposit accounts, recurring deposit accounts, certificates of deposit, time deposits, mutual funds, mortgages, personal loans, check books, credit cards, debit cards, service by automated teller machines (ATMs), and ATM cards. In order for an enterprise product to be provided, enterprise resources to provide the product must be available. For example, in order for a bank to provide a safe deposit box, a safe deposit box resource must be available.

SUMMARY

Various embodiments described herein may include a device, a system, and an apparatus, and so forth including a memory to store instructions, and processing circuitry, coupled with the memory. The processing circuitry is operable to execute the instructions, that when executed, cause the processing circuitry to identify a request for a product from a user, determine two or more requisite resources to provide the product requested by the user, the two or more requisite resources comprising at least one device and at least one skill useful for fulfilling the request for a product, and identify a location associated with the user based on the request for the product from the user. Various embodiments may determine a set of candidate facilities to fulfill the request for the product based on the two or more requisite resources to provide the product requested by the user and the location associated with the user, wherein each candidate facility in the set of candidate facilities to fulfill the request for the product comprises each of the two or more requisite resources to provide the product requested by the user and satisfy a proximity threshold to the location associated with the user, and compute a set of current resource utilizations for each candidate facility in the set of candidate facilities, wherein the set of current resource utilizations for a respective candidate facility includes an availability of at least one of the two or more requisite resources to provide the product requested by the user. In embodiments, the processing circuitry may evaluate the set of current resource utilizations for each candidate facility in the set of candidate facilities with a machine learning model to determine a set of available facilities and an estimated completion time to fulfill the request for each available facility in the set of available facilities, determine one or more recommended facilities based on the set of available facilities and the estimated completion time to fulfill the request for each available facility in the set of available facilities, and generate output comprising the one or more recommended facilities.

Various embodiments also include a computer-readable medium comprising a set of instructions that, in response to being executed by a processor circuit, cause the processor circuit to determine two or more requisite resources to provide a product based on a request for the product from a user, the two or more requisite resources comprising at least one device and at least one skill, and identify a location associated with the user based on the request for the product from the user. In embodiments, the instructions may determine a set of candidate facilities to fulfill the request for the product based on the two or more requisite resources to provide the product requested by the user and the location associated with the user, wherein each candidate facility in the set of candidate facilities to fulfill the request for the product comprises each of the two or more requisite resources to provide the product requested by the user and satisfy a proximity threshold to the location associated with the user, and compute a set of current resource utilizations for each candidate facility in the set of candidate facilities, wherein the set of current resource utilizations for a respective candidate facility includes an availability of at least one of the two or more requisite resources to provide the product requested by the user. In embodiments, the instructions may evaluate the set of current resource utilizations for each candidate facility in the set of candidate facilities with one or more machine learning model to determine a set of available facilities and an estimated completion time to fulfill the request for each available facility in the set of available facilities, determine one or more recommended facilities based on the set of available facilities and the estimated completion time to fulfill the request for each available facility in the set of available facilities, and provide the one or more recommended facilities as output.

Embodiments, discussed herein, also include a computer-implemented method, including identifying a request for a product from a user, determining two or more requisite resources to provide the product requested by the user, the two or more requisite resources comprising at least one device and at least one skill, and identifying a location associated with the user based on the request for the product from the user. In embodiments, the method includes determining a set of candidate facilities to fulfill the request for the product based on the two or more requisite resources to provide the product requested by the user and the location associated with the user, wherein each candidate facility in the set of candidate facilities to fulfill the request for the product comprises each of the two or more requisite resources to provide the product requested by the user and satisfy a proximity threshold to the location associated with the user, and computing a set of current resource utilizations for each candidate facility in the set of candidate facilities, wherein the set of current resource utilizations for a respective candidate facility includes an availability of at least one of the two or more requisite resources to provide the product requested by the user. In embodiments, the method includes evaluating the set of current resource utilizations for each candidate facility in the set of candidate facilities with one or more machine learning models to determine a set of available facilities and an estimated completion time to fulfill the request for each available facility in the set of available facilities and determining one or more recommended facilities to provide as output based on the set of available facilities and the estimated completion time to fulfill the request for each available facility in the set of available facilities.

DETAILED DESCRIPTION

Figure 1:
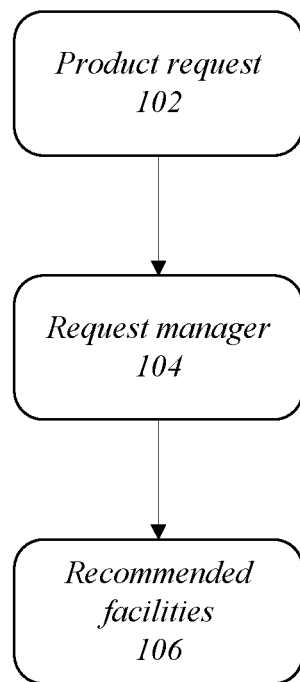
FIG. 1 illustrates exemplary aspects of a system flow according to one or more embodiments described herein.

Various embodiments are generally directed to techniques for fulfilling user requests for enterprise products, for example, banking products and/or services. Embodiments include using a request manager informed by enterprise facility resources and resource utilization to recommend a facility for the fulfillment of a product request. Some embodiments are particularly directed to identifying a product request and determining the equipment and skill set necessary to fulfill the product request. Based on this information and location data, such embodiments are further directed to determine a set of facilities as candidates for the request fulfillment. In some embodiments, a machine learning model is used to analyze current resource utilization of the facilities and predict facility availability and estimated service times for the fulfillment of the request. In various embodiments, a candidate facility may be recommended for fulfillment of a request based on facility availability and estimated service times. In some embodiments, historical resource utilization may be used to inform staffing and equipment service decisions to maximize availability of facilities. These and other embodiments are described and claimed.

Various enterprises often provide customers with physical products as part of their services. For example, a bank may provide a customer with a debit card, credit card, ATM card, or check book for access to funds in the customer's account, a cashier's check for access to funds guaranteed by the bank, or cash as part of a withdrawal. However, challenges exist in facilitating ready access to enterprise products.

For example, a customer may request a product in person from a bank, visiting a branch location, kiosk, bank café, or other physical facility associated with the bank. Such a process can be timely and intrusive to the customer's schedule. For example, a bank branch may only be open during specific business hours, during which the customer may be occupied in another location. Further, even if able to make the visit, a customer may be required to wait either in a line of customers waiting for service from a bank employee or for the processing of the request itself by a bank employee. Furthermore, not every bank facility may possess the equipment or supplies necessary to service the request, for example, a card printer or ink, or be always staffed by employees trained to operate such equipment. In this example, a customer may travel to a bank facility only to find the facility unable to fulfill their request. Such inconveniences, among others, may contribute to a difficulty for customers to effectively access products offered by an enterprise.

Some enterprises may allow customers to make product requests of banks from remote locations. For example, a customer may call a bank's customer service line from a phone and make the request of an operator. Similarly, a request may be made over an online system, for example, a bank website or a bank API on a customer's mobile device. The product may then be mailed to a customer, but mail is slow, and the processing of the request and/or the mailing of the product may take unacceptable amounts of time. Further risks are introduced such as mail delays and shipping errors. A customer may then wait for at least days after a product request for the product to be delivered. After the delivery of some products, such as a debit or credit card, a customer may then still need to coordinate with an enterprise to activate the product.

However, further factors may affect the enterprise facility's ability to fulfill the request. If a certain facility services a high number of customers in a given day or is understaffed, the employees may not have time to process the request by the time the customer or a courier arrives to pick up the product. Furthermore, even if the request was processed in time for the pickup, other customers at a busy enterprise facility may be frustrated to watch as an incoming customer or courier seemingly cuts to the front of the line of service or as enterprise employees prioritize a queue of requests for customers not present at the enterprise.

These challenges, among others, may characterize a frustrating product pipeline from enterprise to customer, leading to poor quality of service. Enterprise employees and customers may be inconvenienced by significant stalls and interruptions to their schedules, product delivery may be delayed, and the experience of further customers and third parties such as couriers may be negatively affected.

Various embodiments described herein can remedy one or more of these challenges and weaknesses. Particularly, embodiments described herein include components that can improve management of customers' requests for enterprise products with respect to various facilities. In embodiments, at least one facility may be recommended to fulfill a request for an enterprise product based on particular requirements of the request, capabilities of the facility, and current and historical usages of facility resources. In various embodiments, historical usages of facility resources may be used to inform further staffing and infrastructure decisions of the enterprise. Components described herein will therefore increase efficiency of providing service to enterprise customers, minimize undue strain on enterprise employees, and enable enterprises to maximize utilization of their resources. Accordingly, in various embodiments described herein, dynamic assignment of product requests to facilities based on historical, current, and/or estimated availability of resources may be implemented in a practical application to increase capabilities and improve adaptability of enterprise systems as a whole. Additionally, or alternatively, in several embodiments described herein, recommendation of enterprise resource utilization strategies based on historical, current, and/or future resource availability and/or utilization may be implemented in a practical application to increase capabilities and improve adaptability of enterprise systems.

In various embodiments, one or more of the components, techniques, or aspects described herein may be implemented via one or more computing devices, resulting in increased capability and improved functioning of the computer devices. Specific and particular manners of automatically monitoring facility resource utilization, analyzing trends in resource utilization, and/or dynamically distributing product requests may be provided by the components described in various embodiments herein. In several embodiments, expected behaviors and behaviors involving the update and management of enterprise facility resources may be performed independently of software utilizing the request management via familiar, user-friendly interface objects.

In various embodiments, components, techniques, or aspects described herein may be implemented as a set of rules that improve computer-related technology by allowing a function not previously performable by a computer that enables an improved technological result to be achieved. For example, generating an output comprising a facility recommended to fulfill a user's product request based on historical resource utilization at a plurality of facilities may be an improved technological result.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates exemplary aspects of a system flow 100 according to one or more embodiments described herein. The system flow may include a product request 102, a request manager 104, and recommended facilities 106. Embodiments are not limited in this context.

The product request 102 may be based on input received via a user interface, such as a graphical user interface (GUI) displayed on a mobile device. In some embodiments, a user may be a customer of an enterprise, such as a bank. For example, the customer may be a user of an online platform that may be associated with the bank. In some embodiments, the product request 102 may comprise a request for at least one physical item or service. For example, the product may comprise an item such as a debit card, a credit card, a check book, a cashier's check, or cash. Furthermore, the product may comprise a service such as financial advising. A user may make a product request 102 by using a website or application associated with the enterprise on a mobile device or computer, by way of example. In some embodiments, the request may be made while a user is logged into an online account associated with their used services at the enterprise. Methods of making the product request 102 are not intended to be limited at this point.

The product request 102 may include information received from the user. For example, the user may input data using a user interface, such as a GUI, including their name, phone number, email address, location, product desired, and/or method of delivery, including direct pickup from a branch in a geographic area or courier delivery to an address. If a courier is to be used, the request may include identifying information of the courier in the request. If the user made the request while logged into an online account associated with their used services at the enterprise, information about their account may be included in the request. The product request 102 may also include information from other sources, including the mobile device or computer used to make the request and other APIs and applications used by the user. For example, location data could be provided by the client's device or by a third-party global positioning system application (GPS).

The product request 102 may be identified by the request manager 104. The request manager 104 may receive the product request 102 in a secure manner, for example, encrypted, secure tunnel, and so forth. The request manager 104 may extract information from the request 102. For example, the request manager 104 may extract the product desired, the user identity, the user location, the user account information, and delivery preferences.

The request manager 104 may also include or have access to data comprising enterprise facilities. Each enterprise facility may be associated with data currently and historically specific to that facility. For instance, such data may include the facility address, services provided at a facility, the presence of equipment and supply quantities needed to provide products, employees present at the facility, employees logged into a system at a facility, such as an electronic time card system, employees currently not engaged in or soon to be engaged in another task, and skills in which present employees have been trained. Such skills may include technical skills, such as using a card printer, or soft skills, such as customer service. Further examples of data associated with an enterprise facility include the number of customers at a facility in a waiting queue, regular traffic patterns, prescheduled appointments, events scheduled at the facility, including events scheduled for customers and for employees, and appointments requested by walk-in customers. Further examples of data associated with an enterprise facility include utility statuses of the facility, such as operating electricity, internet, and water capabilities and rates, and the number of vehicles parked in a parking lot for the facility, as detected by a parking meter, a security camera or sensor, or satellite feed. One of ordinary skill in the art will recognize that further data useful for assessing the capability of an enterprise facility to handle requests at a particular time may be included.

In some embodiments, the request manager 104 may have access to data associated with enterprise facilities via at least one application programming interface (API). Partner applications may be managed by the enterprise or by a third party. In some embodiments, information requested from a third party via API may comprise information that does not identify specific users, thereby maintaining user privacy. For example, data may be received via an API from a third-party GPS system. Such data may identify that a number X of users of the GPS system are en route to the facility and/or that each of the X customers are expected to arrive at the facility at a certain time. It will be understood that various other methods may be taken to integrate data from third-parties into the analysis of the request manager 104 as described herein.

The request manager 104 may consider the product request 102 and identify recommended facilities 106 to fulfill the product request 102. Further data associated with enterprise facilities may be used in conjunction with the product request 102 by the request manager 104 in identifying the recommended facilities 106. In some embodiments, the recommended facilities 106 is a single enterprise facility best suited to fulfill the product request based on specific information of the product request 102 and other information considered by the request manager 104. In some embodiments, the recommended facilities 106 may include several enterprise facilities suited to fulfill the product request. In these embodiments, the several enterprise facilities may be ranked or ordered according to their suitability. Suitability may be determined by the request manager 104 according to proximity of the enterprise facility to the user, the presence of equipment and supplies at the facility to enable the fulfillment of the product request 102, the availability of employees at the enterprise facility who have the skills to fulfill the product request, the busyness of the enterprise facility, and other factors known to the request manager 104.

A facility from the recommended facilities 106 may be selected to fulfill the product request 102. In some embodiments, the facility selected to fulfill the product request 102 may be the most suitable as determined by the request manager 104. In other embodiments, several recommended facilities 106 may be suggested to the user. In such embodiments, the user may select one facility from the several recommended facilities 106 to fulfill the request. In other embodiments, a facility may be selected to fulfill the product request 102 with feedback from facilities among the recommended facilities 106.

Figure 2:
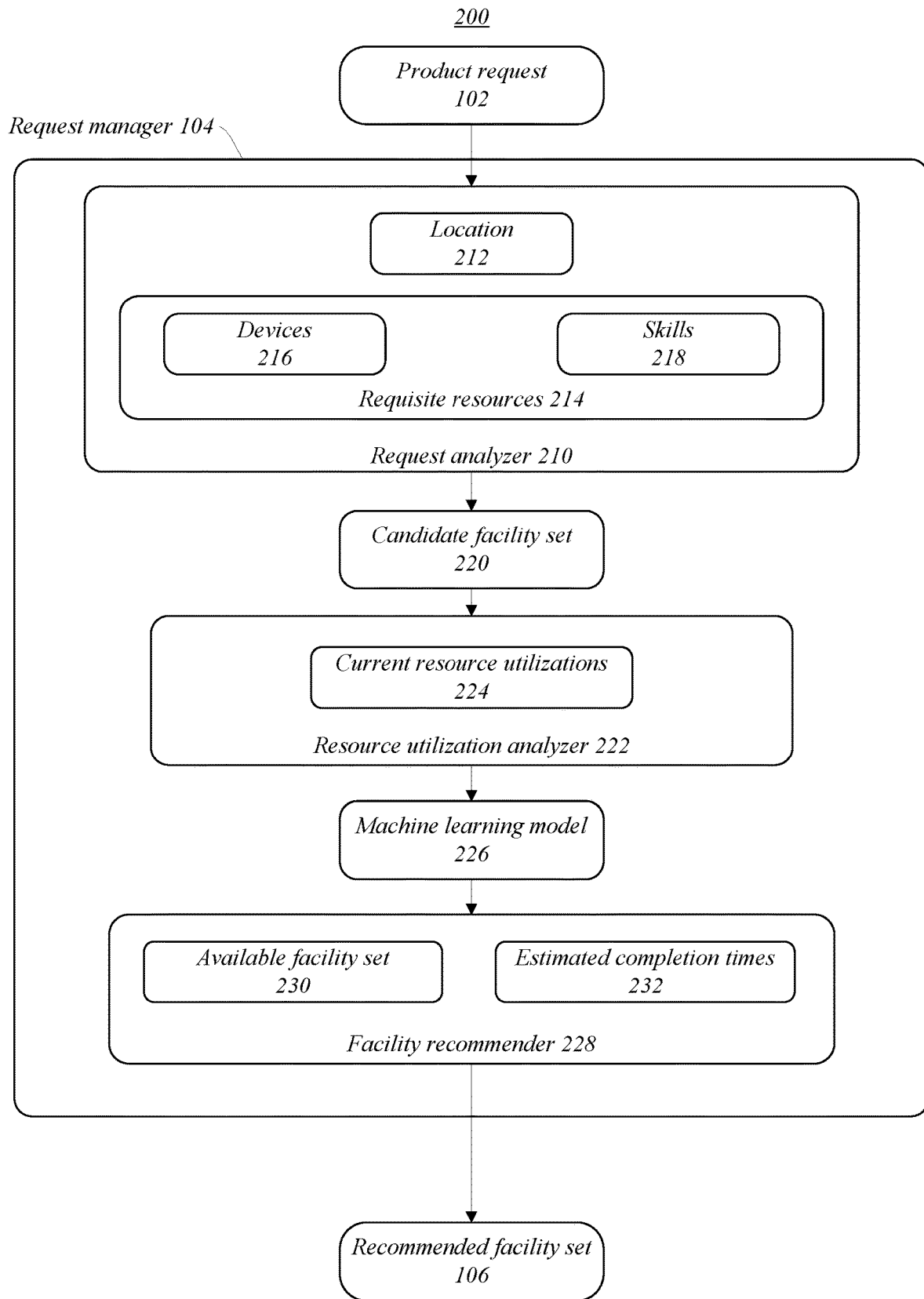
FIG. 2 illustrates exemplary aspects of processing a product request according to one or more embodiments described herein.

FIG. 2 illustrates exemplary aspects of processing a product request according to one or more embodiments described herein. In architecture 200, a product request 102 may be received by a request manager 104. The request manager may comprise a processing system that includes one or more computing devices that are interconnected via one or more network links, e.g., wired, wireless, fiber, etc. In some embodiments, the request manager may be a distributed computing system with each server comprising one or more cores to process information and data. Embodiments are not limited in this context.

The request manager 104 may include a request analyzer 210 which may process the product request 102. The request analyzer 210 may identify from the product request 102 information specific to the product request. For example, the request analyzer 210 may identify a product desired, information identifying a user, or any combination of data included in the product request 102.

The request analyzer 210 may identify data pertaining to location 212. Location 212 may describe a user location at the time the product request 102 was generated or be a separate location specified in the product request 102. For instance, a product request 102 may be generated while a user is at their workplace, but the user may wish the product request 102 to be fulfilled near their home. In this case, the location 212 in the product request 102 may comprise the user's home address. In some embodiments, location 212 may be gathered from the device from which the product request 102 was received, for example, by an internet protocol (IP) address of the device. Location 212 may be gathered from third-party applications and services. For example, a location 212 may be identified from a GPS navigation service.

In various embodiments, location 212 may comprise multiple locations identified via one or a combination of the methods described above. For example, if a user is travelling between a first location and a second location, both locations may be provided as part of the product request 102, determined according to location updates from the user's device, or identified by a third-party service such as a GPS navigation system. If the user is travelling a route with intermediate stops, the locations of such stops may also be included in location 212.

The request analyzer 210 may identify requisite resources 214 necessary or helpful for generating the product identified in the request. Requisite resources 214 may include devices 216 such as an automated teller machine (ATM), a money counter, a vault, safety deposit boxes, a coffee machine, a certified check printer, a bank card encoder, internet-connected computers, card printers, cardstock, bank card blanks, ink supply, check supply, supply, and other devices or materials necessary to manufacture, activate, or otherwise fulfill a request for the requested product. Requisite resources 214 may identify skills 218 that may be required or useful for an enterprise employee to have or be trained in to use devices 216 or otherwise fulfill the product request 102. Skills 218 may include technical skills and/or soft skills. Skills 218 may include, by way of example, training on a particular software or network system, training to operate card printing hardware, skills in mortgage sales, small business banking, teller, public notary customer service, financial counseling, or other training certification. Skills 218 may include other skills recognized by a person of ordinary skill in the art as being of benefit in performing other tasks related to an enterprise or enterprise facility. Skills 218 may be associated with permissions or security levels.

The request analyzer 210 may use location 212 and requisite resources 214 to identify a candidate facility set 220. The candidate facility set 220 may comprise enterprise facilities under a threshold distance from the location 212 that possess the requisite resources 214 to fulfill the product request 102.

In some embodiments, the request manager 104 may consider feedback from employees concerning the product request. The product request 102 or an indication of the product request 102 may be forwarded to facilities in the candidate facility set 220 or to at least one employee at such a facility, for example, via email or user interface. A receiving employee may be recognized to possess the skills 218 necessary to fulfill the product request 102. In some embodiments, the receiving employee may indicate availability or unavailability to fulfill a request. This indication may be received by a resource utilization analyzer 222 as an input. In some embodiments, this indication may be used to directly filter a candidate facility set 220.

The request manager 104 may analyze a candidate facility set 220 using the resource utilization analyzer 222. The resource utilization analyzer 222 may determine current resource utilizations 224 of the facilities in the candidate facility set 220. Current resource utilizations 224 may pertain to requisite resources 214 for fulfilling the product request 102, to other facility resources, or to any combination thereof. For example, if a product request 102 identifies that a new debit card is needed, requisite resources 214 might be identified as several devices 216 and skills 218 as follows: devices comprising a card printer, a card blank, a computer for associating a new card with a user account and activating it; and skills comprising training to operate a card printer including loading the printer with a card blank, training to associate new cards with particular accounts, and training to activate cards. In such an example, a facility identified in the candidate facility set 220 may be recognized by the resource utilization analyzer 222 as having current resource utilizations 224 pertaining to a separate user's appointment scheduled for loan advisement, to a scheduled training for bank employees on mortgage offerings, and to a lack of card blank supply at the facility. Current resource utilizations 224 may include data such as regular traffic patterns, existing product requests, a size of a check in queue at the facility, prescheduled appointments, activities scheduled at the branch including events scheduled for users and for employees, and/or appointments requested by walk-in users. Further examples of current resource utilizations include utility statuses of the facility, such as operating electricity, internet, and water capabilities and rates. Further examples include the number of customers en route to the facility, the number of navigation systems with the facility set as a destination, and the number of vehicles parked in a parking lot for the facility, as detected by a parking meter, a security camera or sensor, or satellite feed. One of ordinary skill in the art will recognize that further data useful for assessing the current utilization of facility resources may be included.

The request manager 104 may include a machine learning model 226 used to further assess the availability of facilities within the candidate facility set 220 to fulfill the product request 102. The machine learning model 226 may be used to probabilistically determine the availability of facilities in the candidate facility set to fulfill the product request 102 by estimated completion times.

A facility recommender 228 may use a machine learning model 226 to determine an available facility set 230 from the candidate facility set 220. Estimated completion times 232 for the available facility set 230 to be able to fulfill the product request 102 may be determined according to the machine learning model. The facility recommender 228 may use the available facility set 230 and estimated completion times 232 to generate a recommended facility set 106.

Figure 3A:
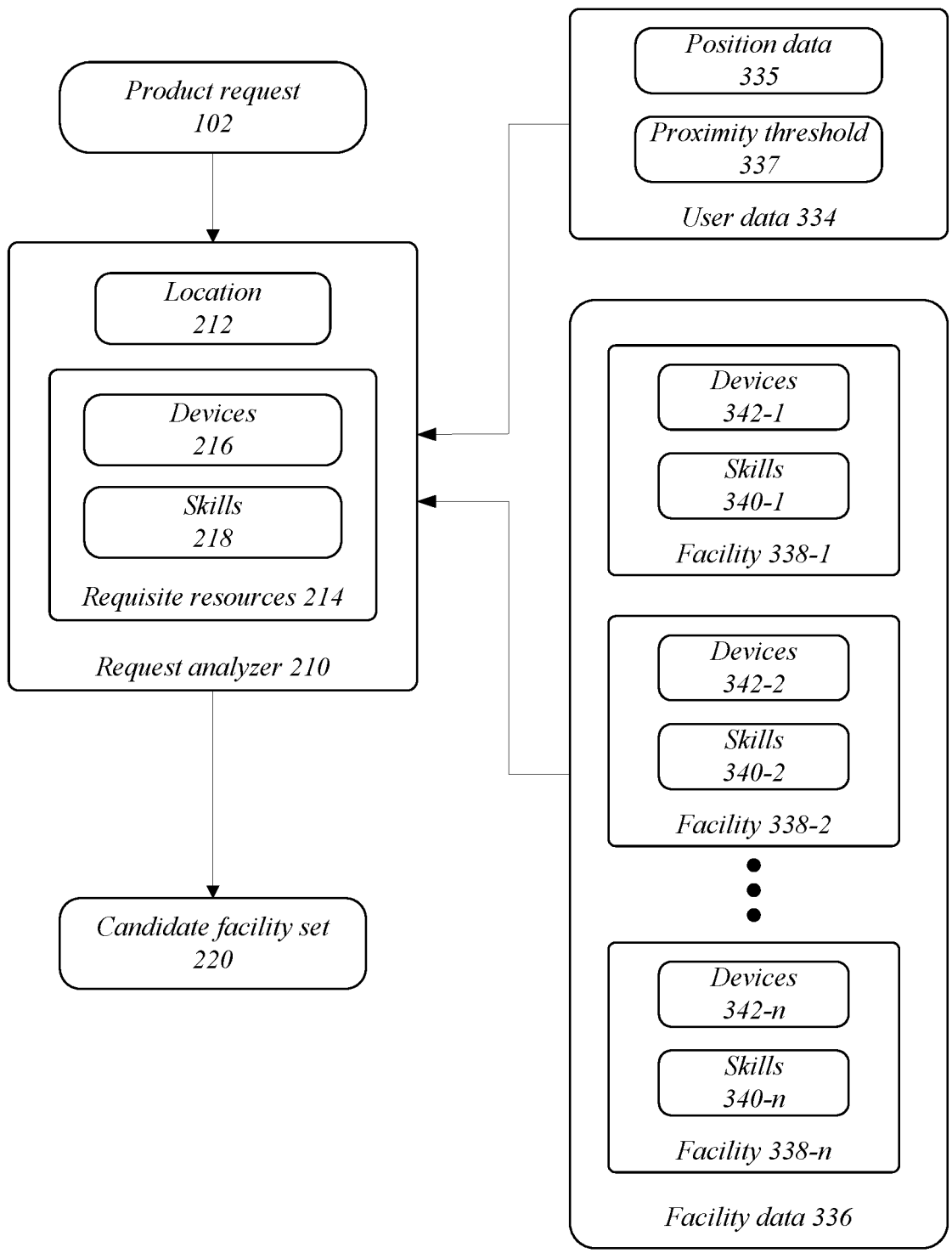
FIG. 3A illustrates exemplary aspects of identifying candidate facilities according to one or more embodiments described herein.

FIG. 3A illustrates exemplary aspects of identifying candidate facilities according to one or more embodiments described herein. In architecture 300A, a product request 102 is analyzed by a request analyzer 210. The request analyzer 210 may generate a candidate facility set 220 based on the product request 102. Embodiments are not limited in this context.

Specifically, the request analyzer 210 may identify requisite resources 214 for fulfilling the product request 102. Such requisite resources 214 may comprise devices 216 and skills 218 useful for fulfilling the product request 102. The request analyzer 210 may further identify location 212 useful for determining the facility set. In some embodiments, location 212 may be identified from the product request 102. In some embodiments, location 212 may comprise a geographic region to be used to identify a candidate facility set.

The request analyzer 210 may receive additional user data 334 to inform the determination of the candidate facility set 220. User data 334 may be collected from a user's device, user input received via a user interface, such as a GUI displayed on a mobile device, or from other sources such as third-party platforms. User data 334 may include position data 335, which may comprise the user's current position, a separate position, or several positions. User data 334 may further comprise a proximity threshold 337. A proximity threshold 337 may relate to the position data 335 and either be received as user input or be preset as a default value.

The request analyzer 210 may receive facility data 336 to inform the determination of the candidate facility set 220. In some embodiments, the request analyzer 210 may be coupled with a storage system which may contain data structures, such as one or more databases, to store information and data including the facility data 336. In embodiments, the request analyzer may be coupled to the storage system via one or more wired and/or wireless networking links. In some embodiments, the storage system may be local to the request analyzer or in a different location. The facility data 336 may contain data on n facilities 338-$n$, where n is a positive integer.

Facility data 336 may comprise data on all facilities associated with a bank or be prefiltered to include facilities within a geographic region. In some embodiments, facility data 336 may be limited to a geographic region relating to the user data 334 or the location 212 recognized by the request analyzer 210. In some embodiments, n may be predetermined. In these embodiments, n facilities may be included in the facility data 336 according to their proximity to the location 212 or the user data 334 recognized by the request analyzer 210. For example, if n=10, facility data 336 may contain data for facilities 338-1 through 338-10 for the 10 facilities closest to position data 335.

Data associated with facility 338-$n$ may comprise data relevant for that facility, including devices 342-$n$ and skills 340-$n$. Devices 342-$n$ may comprise devices, supplies, and/or other tangible resources available at a particular facility 338-$n$. Skills 340-$n$ may comprise technical and/or soft skills in which employees at facility 338-$n$ are trained or are otherwise competent.

In various embodiments, the request analyzer 210 may generate a candidate facility set according to the requisite resources 214 identified as relating to the product request 102, location 212, user data 334, facility data 336, or any combination thereof. In some embodiments, the request analyzer 210 may select a candidate facility set 220 such that candidate facilities meet each of the criteria provided. In other words, criteria provided to the request analyzer may be used to conduct indexed searches for facilities suitable to be included in a candidate facility set 220. For example, facilities from the facility data 336 may be filtered according to the devices 216 and skills 218 required to fulfill the product request 102 and matched to a general location 212, particularly within a proximity threshold 337 of a position data 335. Each of these factors may be used as a strict filter.

In some embodiments, the request analyzer 210 may rank and/or order potential facilities to be included in the candidate facility set 220 according to their satisfaction of the received criteria. In such cases, the request analyzer 210 may give different weights to different criteria. Some criteria may be used to strictly filter, for example, the matching of devices 216 required to fulfill a product request 102 to devices 342-$n$ present at facility 338-$n$ may be necessary for facility 338-$n$ to be included in the candidate facility set 220. Such a weight for the presence of required devices may be, for example, 1, while the weight corresponding to the absence of such may be, for example, 0. Other weights may be between such and assigned to give preferences to criteria over others, according to a facility's satisfaction of the criteria, or a combination thereof. For instance, if a facility 338-$n$ falls a short distance beyond a proximity threshold 337 with respect to a preferred location 212, the facility 338-$n$ may be further considered for the candidate facility set 220. However, such a facility 338-$n$ may be assigned an intermediate weight such that it is not ranked as highly as it would have been had it been located nearer to the location 212. Such weighting may be decided by set scales or determined by a machine learning component trained on historical selections of facilities from candidate sets. Embodiments are not intended to be limited at this time.

The candidate facility set 220 generated by the request analyzer 210 comprises at least one facility 338-$n$ capable of fulfilling the product request 102. Facilities in the candidate facility set are within an overall distance threshold from preferred location 212 and have the requisite resources 214 to fulfill the request. A person of ordinary skill in the art will recognize that additional data specific to facilities may be included in said database and that additional criteria may be used to determine the set of candidate facilities. In some embodiments, the candidate facility set may contain several facilities which meet the required criteria. In these embodiments, facilities may be in an unordered list in the candidate facility set and/or ranked according to their closeness of fit to the criteria considered by the request analyzer 210.

Figure 3B:
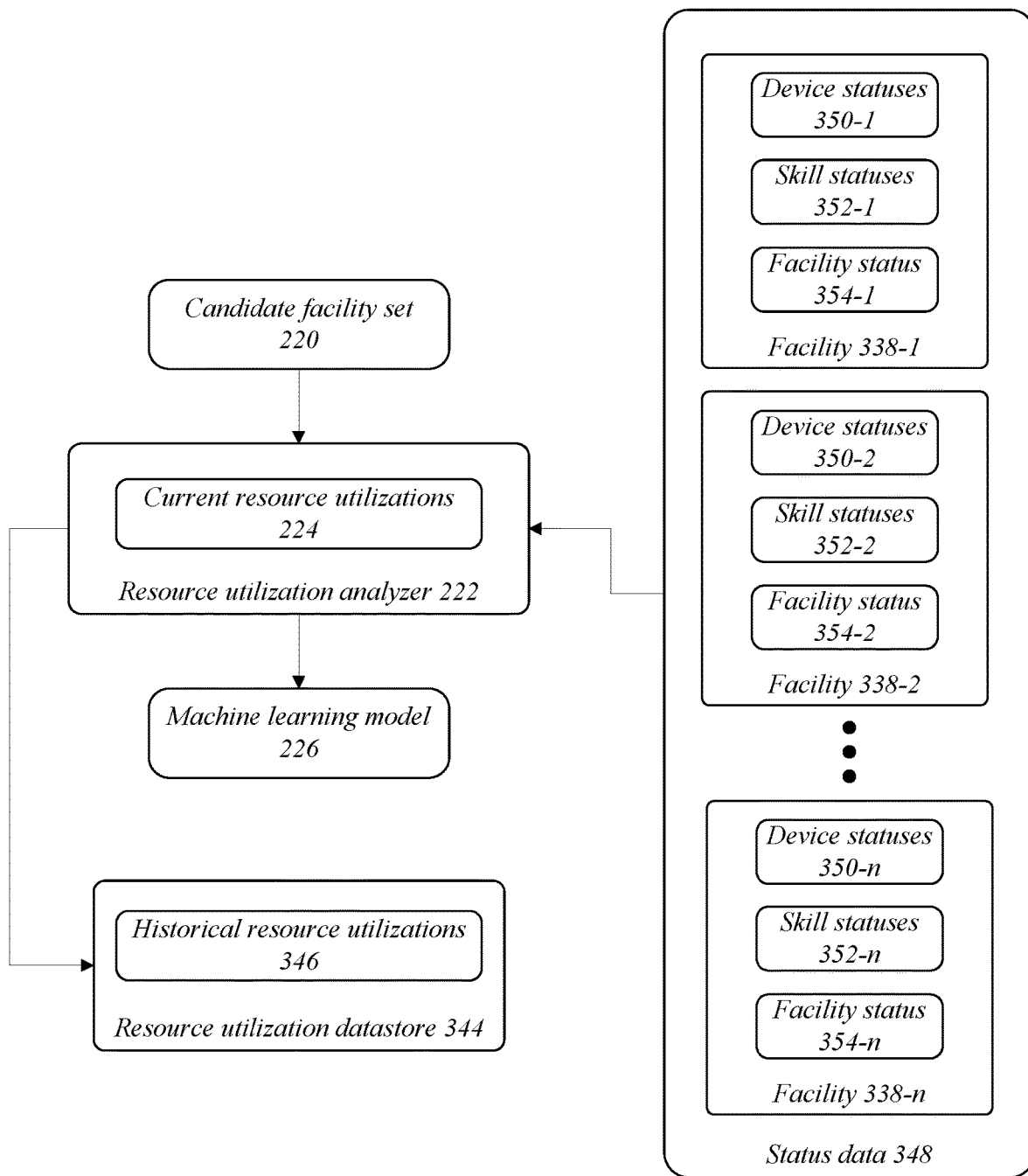
FIG. 3B illustrates exemplary aspects of processing resource utilizations according to one or more embodiments described herein.

FIG. 3B illustrates exemplary aspects of processing resource utilizations according to one or more embodiments described herein. In architecture 300B, a resource utilization analyzer 222 may receive a candidate facility set 220. The candidate facility set 220 may include n facilities, where n is a positive integer. Embodiments are not limited in this context.

In some embodiments, the resource utilization analyzer 222 may be coupled with a storage system which may contain data structures, such as one or more databases, to store information and data including the status data 348. In embodiments, the resource utilization analyzer may be coupled to the storage system via one or more wired and/or wireless networking links. In some embodiments, the storage system may be local to the resource utilization analyzer or in a different location.

In some embodiments, the status data 348 may be updated in real-time or near real-time. Updates to status data may be made by employees regarding a facility's use of resources or automatically in response to received data from sensors associated with the facility and known scheduled events, meetings, or other resource utilizations. In some embodiments, aspects of status data 348 may be updated in coordination with data received via at least one API, as described herein.

In response to receiving the candidate facility set 220, the resource utilization analyzer 222 may receive status data 348 for the facilities in the candidate facility set 220. For each facility 338-$n$ in the candidate facility set 220, status data 348 may include current device statuses 350-$n$, skill statuses 352-$n$, and facility statuses 354-$n$. Device statuses 350-$n$ may relate to the current operating status or availability of the devices 342-$n$ at the facility 338-$n$. For example, a printer may be shown as being used, offline, or out of ink. Skill statuses 352-$n$ may show the availability of employees with skills 340-$n$ regularly associated with a facility 338-$n$. For example, if a facility has one employee with training to operate a particular software system, but that employee is not at work or is occupied in another activity, the status of that skill may be shown as unavailable. Facility statuses 354-$n$ may relate to other operational details more generally related to a facility. For instance, if a facility 338-$n$ is closed, such a facility status 354-$n$ may be shown as unavailable. Additionally, a facility 338-$n$ may be shown to be unavailable if certain resources relating to the general operation of the facility are currently unavailable. For instance, if a facility is experiencing an electric power outage, such a facility status 354-$n$ may be shown as unavailable. Status data 348 for each facility may include timestamps of the most recent status update for each type of status. Alternatively, status data 348 may include a timestamp associated with the status collection.

The resource utilization analyzer 222 may analyze the status data 348 with respect to the candidate facility set 220 to record current resource utilizations 224. Current resource utilizations 224 may comprise utilization of resources of at least one facility among the facilities in the candidate facility set 220 at a particular time. The utilization of resources may be determined with status data 348 received regarding that facility 338-$n$.

The current resource utilizations 224 may be stored with timestamps in a resource utilization datastore 344. In some embodiments, the resource utilization datastore 344 may be a storage system which may contain data structures, such as one or more databases, to store information and data including the historical resource utilizations 346. In embodiments, the resource utilization database may be coupled to the system via one or more wired and/or wireless networking links. In some embodiments, the resource utilization database may be local to the system or in a different location. The resource utilization datastore 344 may store current resource utilizations 224 across time as historical resource utilizations 346. Historical resource utilizations 346 may include timestamps associated with logged resource utilization data.

In various embodiments, current resource utilizations 224 may be analyzed using a machine learning model 226. The machine learning model 226 may be trained on or built with historical resource utilizations 346 and associated completion times of product requests. Historical resource utilization may provide the machine learning model 226 with context for the continued availability or unavailability of resources, where the resources have been recognized as available or unavailable for utilization as recognized by the resource utilization analyzer 222 in current resource utilizations 224.

Figure 4A:
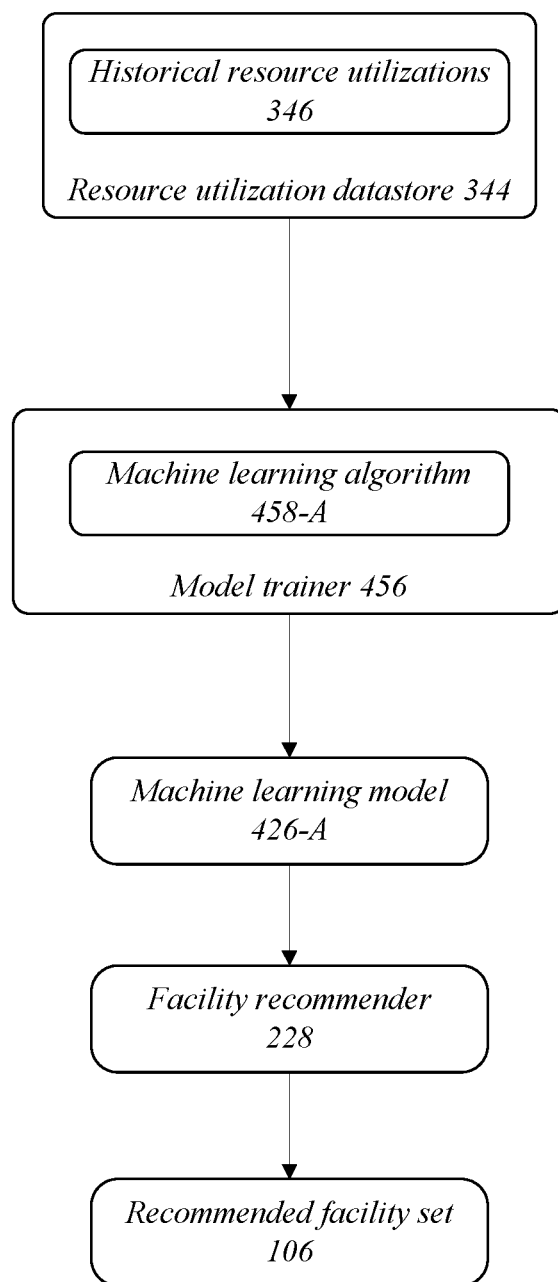
FIG. 4A illustrates exemplary aspects of using historical resource utilizations according to one or more embodiments described herein.

FIG. 4A illustrates exemplary aspects of using historical resource utilizations according to one or more embodiments described herein. Embodiments are not limited in this context.

In architecture 400A, historical resource utilizations 346 in the resource utilization datastore 344 may be received by a model trainer 456. The model trainer 456 may use a machine learning algorithm 458-A to analyze the historical resource utilizations 346. The model trainer 456 may also consider less persistent data, for example, satellite data or other sensor- or internet-collected data recognizing current or impending resource utilizations. Using the results, the model trainer 456 may generate a machine learning model 426-A. A machine learning model may include the predicted availability of a facility to fulfill a product request 102 by considering not only current resource utilizations 224, but also historic trends in availability. For example, a machine learning model 426-A may be able to recognize current resource availability in conjunction with estimated unavailability due to periodic traffic trends, scheduled activity at the facility or scheduled employee time away from the facility, upcoming holidays, and/or incoming inclement weather. A machine learning model may include the estimated continuity of availability or unavailability of a resource at a facility according to the current context and historical trends of availability at that facility. Estimated continuity may comprise a probability or likelihood of resource availability or unavailability.

In some embodiments, a model trainer 456 may process historical resource utilizations 346 associated with a particular type of product request 102. A machine learning algorithm 458-A may be used to create a machine learning model 426-A that includes an estimated time of completion of a particular type of product request 102 based on historical resource utilizations 346 of a facility when that facility or at least one other facility has received a request for a similar product.

A facility recommender 228 may utilize at least one machine learning model 426-A to generate a recommended facility set 106 by assessing the likelihood of the predicted availability or unavailability of resources at a facility in conjunction with the product request 102. The facility recommender may, in some embodiments, consider estimated times of completion of product request 102 fulfillment. Such estimated times may be part of a machine learning model 426-A, or they may be statically set or predetermined according to at least the type of product requested in the product request 102.

The recommended facility set 106 may include facilities estimated by the facility recommender 228 to be actually available for fulfillment of a product request 102. The recommended facility set 106 may comprise facilities estimated to remain available to process the product request for the duration of the processing time of the request.

Figure 4B:
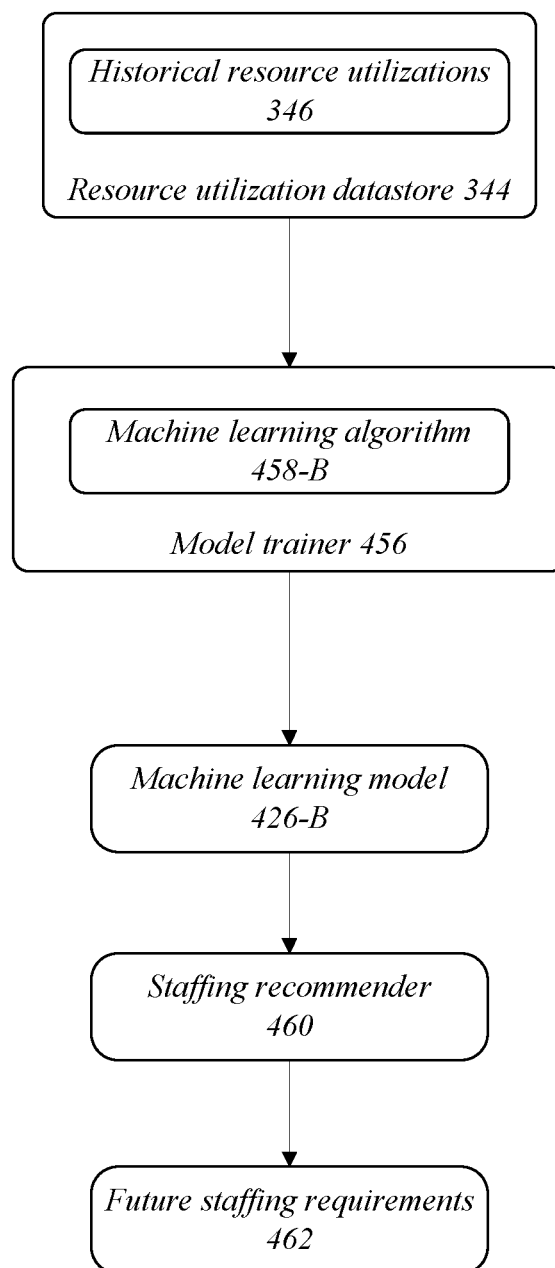
FIG. 4B illustrates exemplary aspects of using historical resource utilizations according to one or more embodiments described herein.

FIG. 4B illustrates exemplary aspects of using historical resource utilizations according to one or more embodiments described herein. Embodiments are not limited in this context.

In architecture 400B, historical resource utilizations 346 may be used to inform current and/or future staffing decisions for a location. Historical resource utilizations 346 in a resource utilization datastore 344 may be provided to a model trainer 456. The model trainer may utilize a machine learning algorithm 458-B designed to consider chronic resource demand, particularly with respect to device statuses and 350-n and skill statuses 352-n for a facility 338-n.

The machine learning algorithm 458-B may be used to create a machine learning model 426-B particularly tuned to predict overuse or underuse of staff or devices in a particular location. In addition to considering chronic workload at a facility, the machine learning algorithm 458-B may consider past and current updates to resource availability at a facility. For example, a facility that has historically had resource utilization indicating an appropriate workload may be recognized as being understaffed if a roster of facility employees is updated to show an employee no longer works at there. In some embodiments, the machine learning algorithm 458-B may consider data reflecting the use of other facilities. For example, a facility may be predicted to receive more traffic and therefore have higher resource utilization if a nearby facility is closed. Estimated overuse or underuse of resources may be probabilistically scored in a resource utilization score.

Based on the specific results of analysis using the machine learning model 426-B, the staffing recommender 460 may identify future staffing requirements 462 for at least one location. Future staffing requirements 462 may indicate an estimation of future resource utilization trends and indication of device and employee resources needed to support that utilization.

The machine learning model 426-B may be used by a staffing recommender 460 to determine if at least one facility is a good candidate for staffing changes. Such a decision may be made by comparing at least one resource utilization score to a to a threshold or by monitoring a facility's score over a period of time. For example, if a resource utilization score has historically indicated that a facility operates at high use but not overuse, but recent scores indicate higher resource utilization than the historically regular precedent, the staffing recommender 460 may identify the facility as a candidate for a staffing addition or for a future staffing change. The recommended staffing change may be identified in the future staffing requirements 462.

A staffing change in this context is intended to mean a change in either device or employee availability at a location. A staffing change relating to devices, for example, may include the installation of a new card printer at a location. A staffing change relating to employees, for example, may include hiring a new employee at a facility who possesses or can be trained in a skill set relating to an identified resource overutilization at the facility.

In some embodiments, the staffing recommender 460 may consider data from multiple facilities. Future staffing requirements 462 may indicate staffing changes for multiple facilities in relation to each other. For example, if a first facility is staffed with a high number of employees skilled in working with a particular software such that there is an underutilization of their skills, but a nearby second facility is staffed with a low number of employees with that skill such that there is an overutilization of those employees, the staffing recommender 460 may recognize these facilities in conjunction with one another. In this case, future staffing requirements 462 may suggest that at least one employee from the first facility with this skillset be transferred to work at the second facility.

In some embodiments, future staffing requirements 462 may be outputted to an analytical body. Such an analytical body may comprise a computer record or a human supervisor able to implement recommendations for staffing changes as identified by the future staffing requirements 462. Embodiments are not intended to be limited in this context.

Figure 5A:
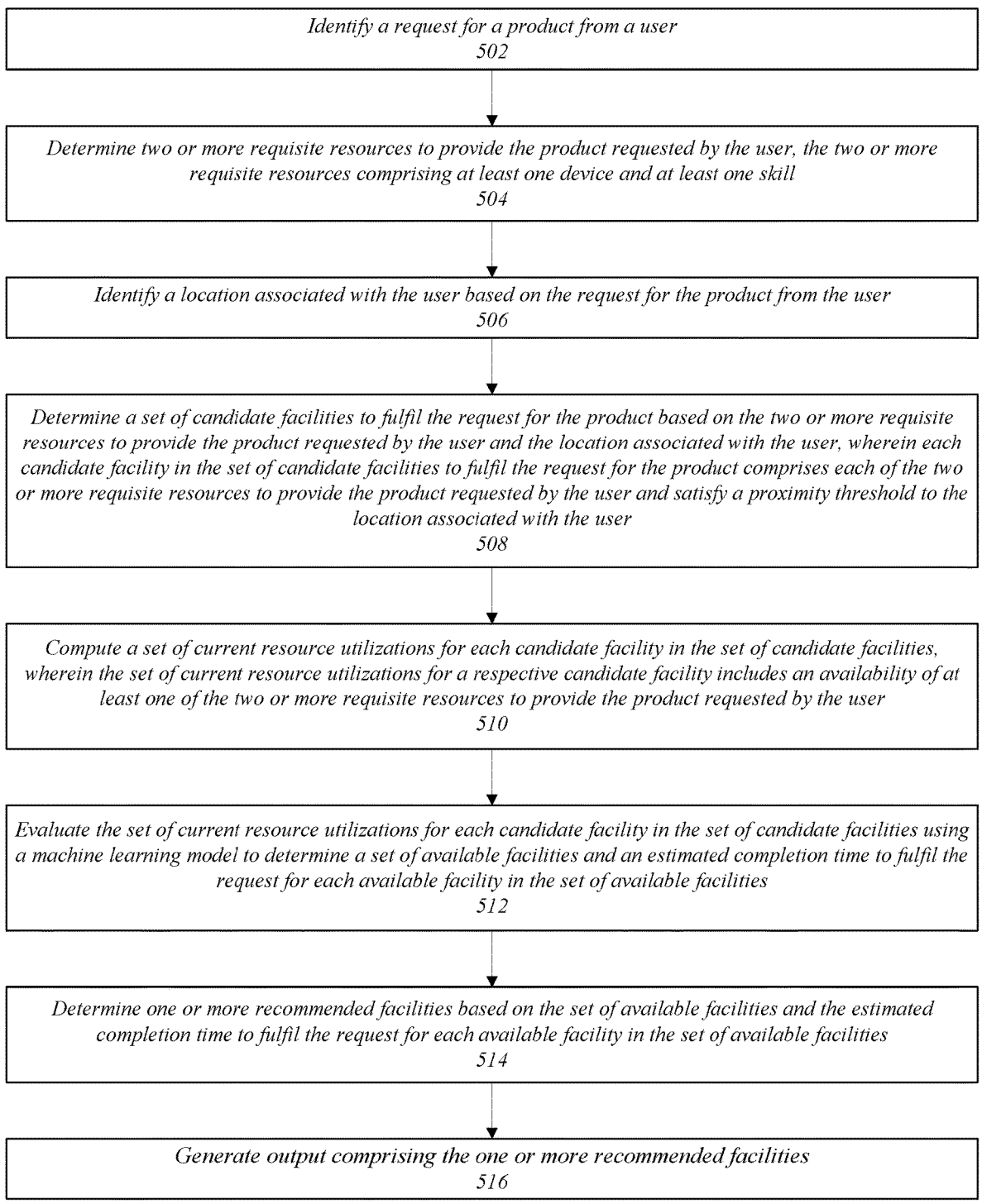
FIG. 5A illustrates an embodiment of a first logic flow according to one or more embodiments described herein.

FIG. 5A illustrates an embodiment of a first logic flow according to one or more embodiments described herein. In some examples, the logic flow may be used, for example, to generate a recommended facility set such as recommended facility set 106 using the product request 102. The logic flow 500A is described with respect to product request 102 and recommended facility set 106 for the purposes of illustration. Embodiments are not limited in this context.

The logic flow may begin at block 502. The system may identify a request for a product. The request may be identified from, for example, a product request 102.

Continuing to block 504, the system may determine two or more requisite resources to provide the product of the product request, the two or more requisite resources comprising at least one device and at least one skill. For example, requisite resources may be identified as at least one device 216 to be used to prepare the product and at least one skill 218 required of an employee to prepare the product. The skill may, in some embodiments, pertain to the operation of the device.

Continuing to block 506, the system may identify a location based on the request for the product. For example, the location may be location 212. In various embodiments, the location may be collected from a user's account on a web system associated with the bank. In other embodiments, the location may be received from a user via a user interface, such as a GUI displayed on a mobile device, or gathered from user data, for example, user data 334. Location may comprise a single location, a plurality of locations, or a region between and/or associated with a plurality of locations.

Continuing to block 508, the system may determine a set of candidate facilities to fulfill the request for the product based on the two or more requisite resources to provide the requested product and the location, wherein each candidate facility in the set of candidate facilities to fulfill the request for the product comprises each of the two or more requisite resources to provide the requested product and satisfy a proximity threshold to the location. For example, a set of candidate facilities may be a candidate facility set 220. In various embodiments, the candidate facilities may be selected from a greater database of facilities, each of which would be associated with the devices present at the facility, the skills of the employees working at the facility, and the facility location. A proximity threshold may be preset, received from a user, for example, as part of the product request 102, or otherwise included in user data, such as user data 334. Embodiments are not intended to be limited in this manner.

Continuing to block 510, the system may compute a set of current resource utilizations for each candidate facility in the set of candidate facilities, wherein the set of current resource utilizations for a respective candidate facility includes an availability of at least one of the two or more requisite resources to provide the requested product. In some embodiments, availability may be determined by considering the presence of supplies for devices included in requisite resources, the functionality of such devices, the engagement of specific employees with the skills specified in the requisite resources, or any combination thereof. Details relating to resource availability may be accessed from at least one table or database which may be updated automatically by an electronic monitoring system or updated manually by an employee. Unavailability of any of the requisite resources at a candidate facility may be reflected in the set of current resource utilizations.

Continuing to block 512, the system may evaluate the set of current resource utilizations for each candidate facility in the set of candidate facilities using a machine learning model to determine a set of available facilities and an estimated completion time to fulfill the request for each available facility in the set of available facilities. In some embodiments, the machine learning model may be trained on historical resource utilization, such as historical resource utilizations 346. Using the machine learning model, the system may be able to understand current resource utilization in the context of historical resource utilization trends. This context may be used to predict the availability of a facility to fulfill a request for a product.

The data used to train the machine learning model may have historical resource utilization data associated with completion times of requests for products. In some examples, the data used to train the machine learning model may specifically be historical resource utilization data similar to the current resource utilization, historical resource utilization data associated with requests for a product similar to the current request for a product, or both. In various embodiments, the system may calculate an estimated completion for each facility among the facilities in the set of candidate facilities to fulfill the request for a product based on the machine learning model.

Continuing to block 514, the system may determine one or more recommended facilities based on the set of available facilities and the estimated completion time to fulfill the request for each available facility in the set of available facilities. In some embodiments, facilities may be first filtered by availability and then ranked or ordered by estimated completion time. In some embodiments, all available candidate facilities may be so ordered by recommendation. In other embodiments, only a certain number of facilities may be recommended. In these cases, only the facilities with estimated completion times in a certain range may be recommended or the facilities with the soonest estimated completion times may be recommended. Embodiments are not intended to be limited in this manner.

Continuing to block 516, the system may generate output comprising the one or more recommended facilities. For example, the output may be a recommended facility set 106. Output may comprise a list or array of the recommended facilities. In various embodiments, the output may include estimated completion times for the product request with the facilities. In some examples, the output may order the facilities according to the estimated completion times.

Figure 5B:
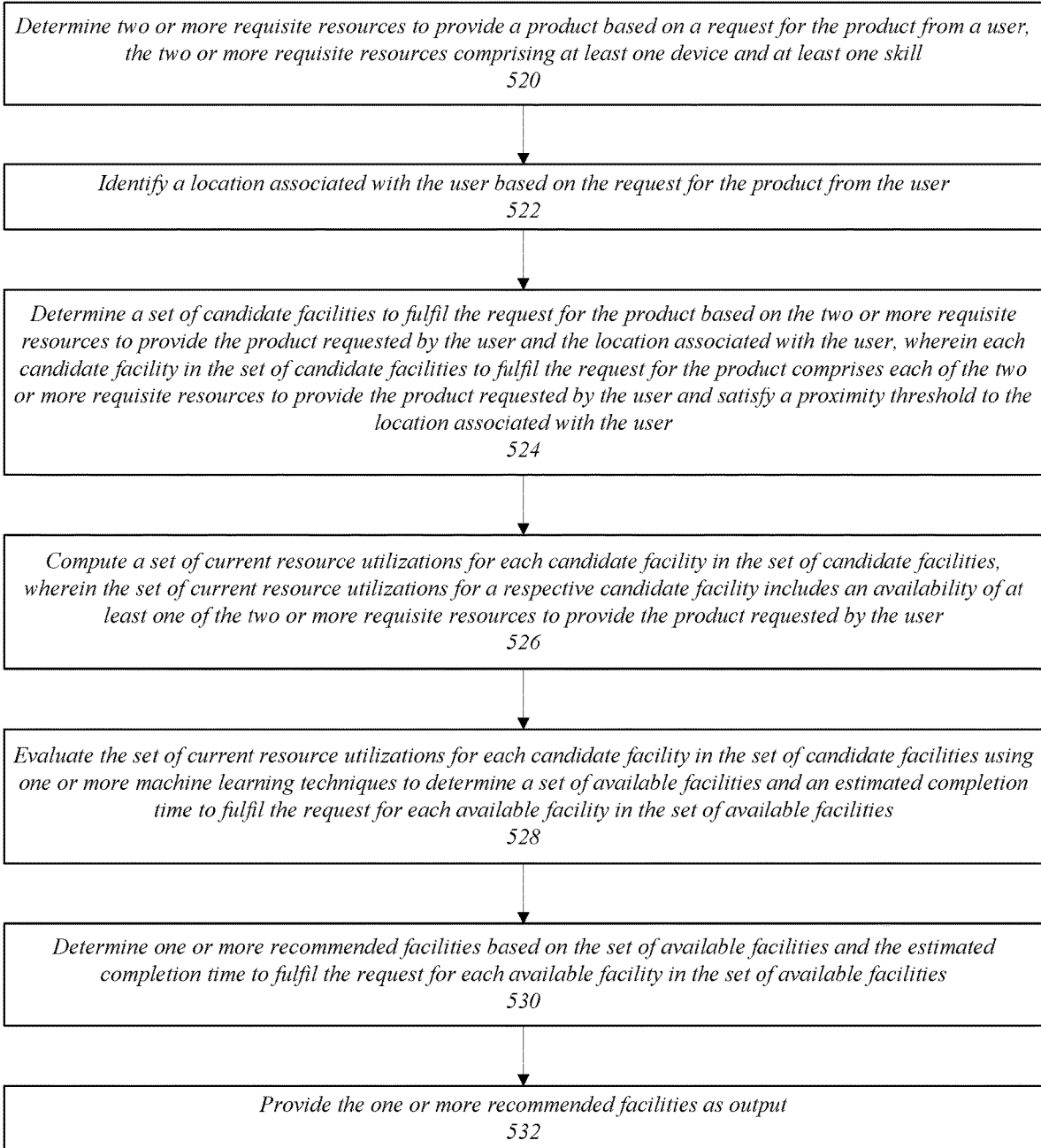
FIG. 5B illustrates an embodiment of a second logic flow according to one or more embodiments described herein.

FIG. 5B illustrates an embodiment of a second logic flow according to one or more embodiments described herein. In some examples, the logic flow may be used, for example, to generate a recommended facility set such as recommended facility set 106 using identified requisite resources 214. The logic flow 500B is described with respect to requisite resources 214 and recommended facility set 106 for the purposes of illustration. Embodiments are not limited in this context.

The logic flow may begin at block 520. The system may determine two or more requisite resources to provide a product based on a request for the product, the two or more requisite resources comprising at least one device and at least one skill.

Continuing to block 522, the system may identify a location based on the request for the product. For example, the location associated with the user may be location 212 or location collected from user data 334. Location may be preset, received from the user, collected from third-party systems, or any combination thereof. Location may comprise a single location, a plurality of locations, or a region between and/or associated with a plurality of locations.

Continuing to block 524, the system may determine a set of candidate facilities to fulfill the request for the product based on the two or more requisite resources to provide the product requested by the user and the location, wherein each candidate facility in the set of candidate facilities to fulfill the request for the product comprises each of the two or more requisite resources to provide the product requested and satisfy a proximity threshold to the location. For example, a set of candidate facilities may be a candidate facility set 220. In various embodiments, the candidate facilities may be selected from a greater database of facilities, each of which would be associated with the devices present at the facility, the skills of the employees working at the facility, and the facility location. A proximity threshold may be preset, received from the user, for example, as part of the product request 102, or otherwise included in user data, such as user data 334. Embodiments are not intended to be limited in this manner.

Continuing to block 526, the system may compute a set of current resource utilizations for each candidate facility in the set of candidate facilities, wherein the set of current resource utilizations for a respective candidate facility includes an availability of at least one of the two or more requisite resources to provide the requested product. In some embodiments, resource availability may be determined according to the presence of supplies for devices included in requisite resources, the functionality of such devices, the engagement of specific employees with the skills specified in the requisite resources, or any combination thereof. Details relating to resource availability may be accessed from at least one table or database which may be updated automatically by an electronic monitoring system or updated manually by an employee. Unavailability of any of the requisite resources at a candidate facility may be reflected in the set of current resource utilizations.

Continuing to block 528, the system may evaluate the set of current resource utilizations for each candidate facility in the set of candidate facilities using one or more machine learning techniques to determine a set of available facilities and an estimated completion time to fulfill the request for each available facility in the set of available facilities. In some embodiments, machine learning techniques may utilize training on historical resource utilization.

Continuing to block 530, the system may determine one or more recommended facilities based on the set of available facilities and the estimated completion time to fulfill the request for each available facility in the set of available facilities. Recommended facilities may be associated with the respective completion times estimated for them to fulfill the request.

Continuing to block 532, the system may provide the one or more recommended facilities as output. For example, the output may comprise the recommended facility set 106.

In some embodiments, the output may be provided to the user via a user interface, such as a GUI. In some embodiments, the user choice or verification of a recommended facility from the output may be received via a user interface, such as a GUI. In response to the reception of a user selection or verification of a facility, the product request may be sent to that facility. In some embodiments, at least one employee may be notified of the request, for example, via email. In some embodiments, the employee notified may be an employee with required skills to complete the request. In certain embodiments, the employee notified may accept the request for a product, in which case the user may be notified. In some embodiments, the employee notified may deny the request, in which case the user may be prompted to select another facility, in which case the request would be forwarded to an employee of that facility. In embodiments, the product request may be added to a queue of tasks at the facility once accepted. In some embodiments, a device at the facility may be set to automatically fulfill the product request.

Figure 5C:
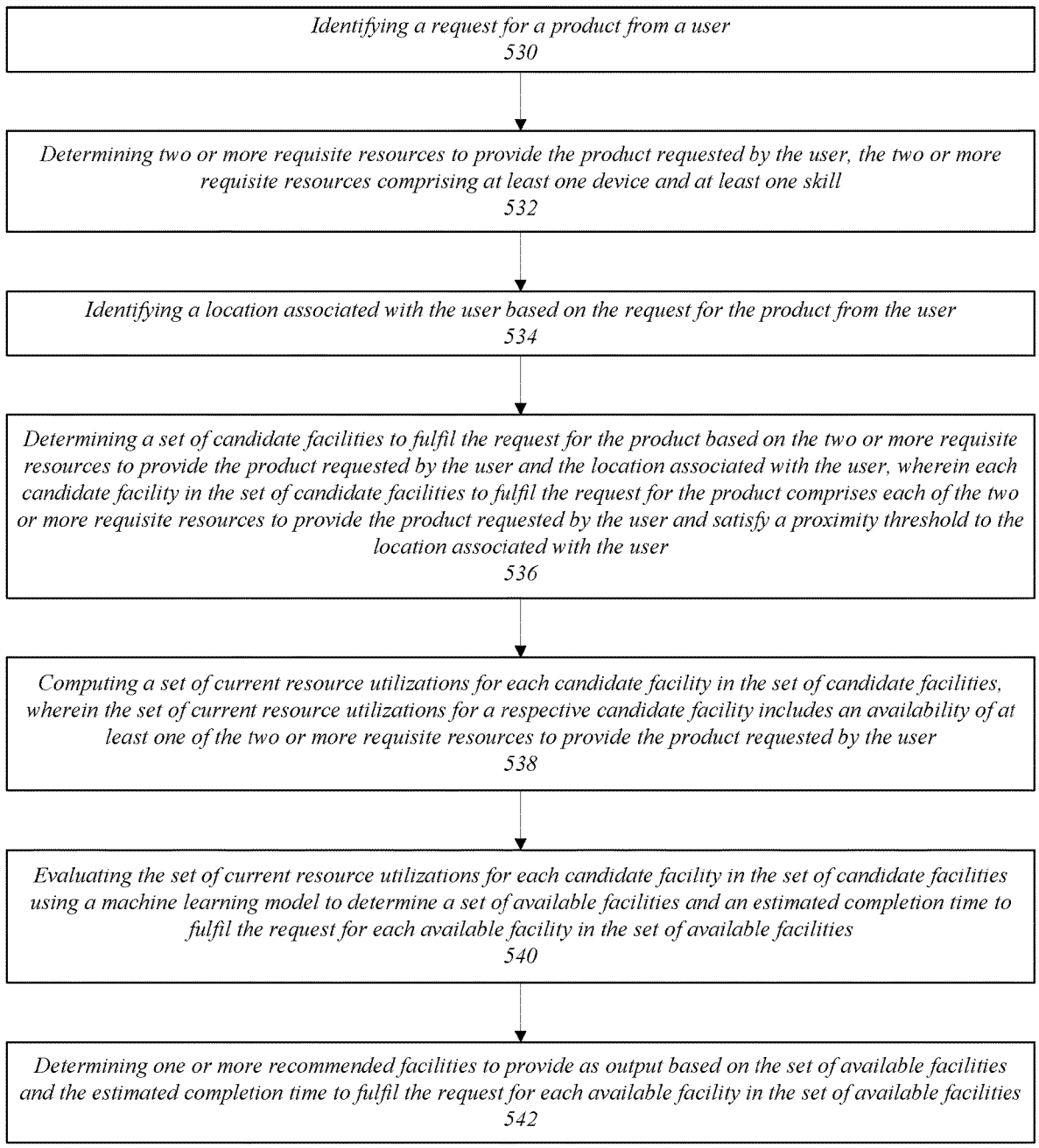
FIG. 5C illustrates an embodiment of a third logic flow according to one or more embodiments described herein.

FIG. 5C illustrates an embodiment of a third logic flow according to one or more embodiments described herein. In some examples, the logic flow may be used, for example, to generate a recommended facility set such as recommended facility set 106 using the product request 102. The logic flow 500C is described with respect to product request 102 and recommended facility set 106 for the purposes of illustration. Embodiments are not limited in this context.

The logic flow may begin at block 502. The system may begin by identifying a request for a product. The request may be identified from, for example, a product request 102.

The system may continue to block 532, determining two or more requisite resources to provide the requested product, the two or more requisite resources comprising at least one device and at least one skill.

The system may continue to block 534, identifying a location based on the product request. The system may continue to block 536, determining a set of candidate facilities to fulfill the request for the product based on the two or more requisite resources to provide the requested product and the location, wherein each candidate facility in the set of candidate facilities to fulfill the request for the product comprises each of the two or more requisite resources to provide the requested product and satisfy a proximity threshold to the location.

The system may continue to block 538, computing a set of current resource utilizations for each candidate facility in the set of candidate facilities, wherein the set of current resource utilizations for a respective candidate facility includes an availability of at least one of the two or more requisite resources to provide the requested product.

The system may continue to block 540, evaluating the set of current resource utilizations for each candidate facility in the set of candidate facilities using a machine learning model to determine a set of available facilities and an estimated completion time to fulfill the request for each available facility in the set of available facilities.

The system may continue to block 542, determining one or more recommended facilities to provide as output based on the set of available facilities and the estimated completion time to fulfill the request for each available facility in the set of available facilities.

Figure 6:
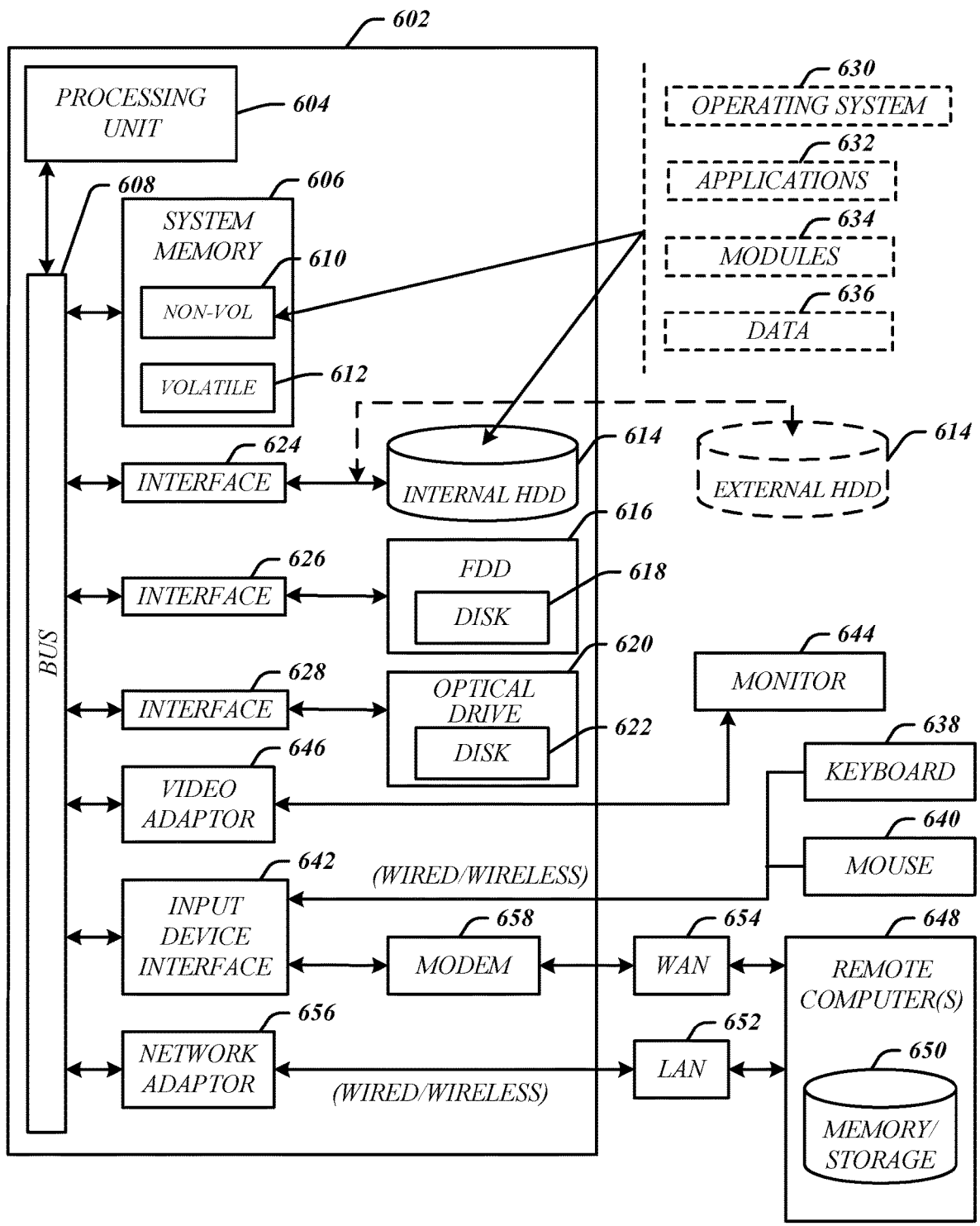
FIG. 6 illustrates an embodiment of a computing architecture according to one or more embodiments described herein.

FIG. 6 illustrates an embodiment of an exemplary computing architecture 600 that may be suitable for implementing various embodiments as previously described. In various embodiments, the computing architecture 600 may comprise or be implemented as part of an electronic device. In some embodiments, the computing architecture 600 may be representative, for example, of one or more component described herein. In some embodiments, computing architecture 600 may be representative, for example, of a computing device that implements or utilizes one or more of request manager 104, request analyzer 210, resource utilization analyzer 222, facility recommender 228, and/or one or more techniques described herein. Embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 604.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE-PROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. In some embodiments, system memory 606 may include main memory. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and Institute of Electrical and Electronics Engineers (IEEE) 694 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include or implement, for example, the various techniques, applications, and/or components described herein.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 994 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. In various embodiments, one or more migrations may occur via the networked environment.

The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
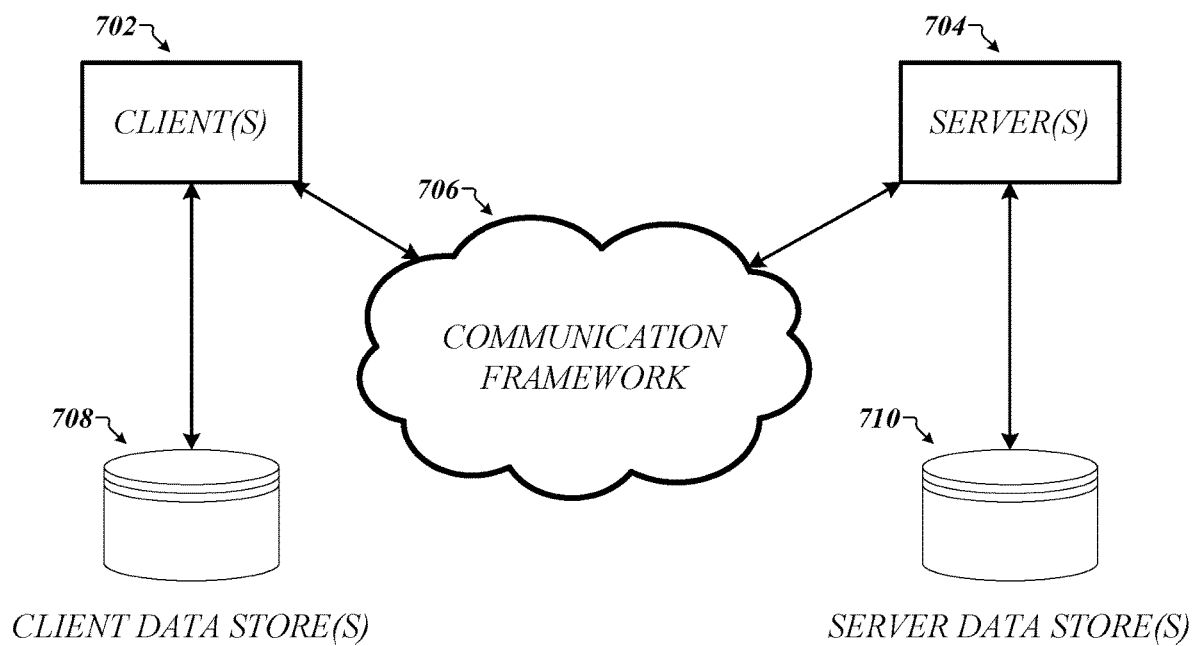
FIG. 7 illustrates an embodiment of a communications architecture according to one or more embodiments described herein.

FIG. 7 illustrates a block diagram of an exemplary communications architecture 700 suitable for implementing various embodiments as previously described, such as virtual machine migration. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. In some embodiments communications architecture may include or implement one or more portions of components, applications, and/or techniques described herein. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described herein in conjunction with storage of data received from any one of clients 702 on any of server data stores 710. In one or more embodiments, one or more of client data store(s) 708 or server data store(s) 710 may include memory accessible to one or more portions of components, applications, and/or techniques described herein.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various users or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The invention claimed is:

1. An apparatus, comprising:
  a processor; and
  a memory comprising instructions that when executed by the processor cause the processor to:
    identify a request for a product from a user;
    determine two or more requisite resources to provide the product requested by the user, the two or more requisite resources comprising at least one device and at least one skill;
    identify a location associated with the user based on the request for the product from the user;
    determine a set of candidate facilities to fulfill the request for the product based on the two or more requisite resources to provide the product requested by the user and the location associated with the user, wherein each candidate facility in the set of candidate facilities to fulfill the request for the product comprises each of the two or more requisite resources to provide the product requested by the user and satisfy a proximity threshold to the location associated with the user;
    compute a set of current resource utilizations for each candidate facility in the set of candidate facilities, the set of current resource utilizations computed based on status data that is automatically updated with data generated by one or more sensors at least one candidate facility in the set of candidate facilities, wherein the set of current resource utilizations for a respective candidate facility includes an availability of at least one of the two or more requisite resources to provide the product requested by the user;
    evaluate the set of current resource utilizations for each candidate facility in the set of candidate facilities with a machine learning model to determine a set of available facilities and an estimated completion time to fulfill the request for each available facility in the set of available facilities;
    determine one or more recommended facilities based on the set of available facilities and the estimated completion time to fulfill the request for each available facility in the set of available facilities; and
    generate output comprising the one or more recommended facilities.

2. The apparatus of claim 1, the memory comprising instruction that when executed by the processor cause the processor to compute the set of current resource utilizations for a candidate facility in the set of candidate facilities based on one or more of a number of appointments at the candidate facility, a number of existing requests at the candidate facility, a number of scheduled activities for requisite resources at the candidate facility, a number of customers en route to the candidate facility, a size of a check in queue at the candidate facility, a number of vehicles in a parking lot of the candidate facility, and a number of navigation systems with the candidate facility as a destination.

3. The apparatus of claim 1, the memory comprising instruction that when executed by the processor cause the processor to generate output comprising the one or more recommended facilities and the estimated completion time for each of the one or more recommended facilities, the output to cause a user interface to present the one or more recommended facilities and the estimated completion time for each of the one or more recommended facilities to the user for selection.

4. The apparatus of claim 3, the memory comprising instruction that when executed by the processor cause the processor to:
  identify a selected facility from the one or more recommended facilities based on input received via the user interface; and
  communicate the request for the product to the selected facility.

5. The apparatus of claim 1, the memory comprising instruction that when executed by the processor cause the processor to determine one or more future staffing requirements for an available facility in the set of available facilities based on the set of current resource utilizations for the available facility in the set of available facilities.

6. The apparatus of claim 1, the at least one device of the two or more requisite resources to provide the product requested by the user comprising one or more of the one or more devices associated with the facility comprising one or more of an automated teller machine, a money counter, a vault, safety deposit boxes, coffee machine, a certified check printer, a bank card encoder, and a bank card blank.

7. The apparatus of claim 1, the at least one skill of the two or more requisite resources to provide the product requested by the user comprising one or more of mortgage sales, small business banking, teller, public notary, and training certification.

8. The apparatus of claim 1, wherein the machine learning model is trained on historical resource utilizations for one or more candidate facilities in the set of candidate facilities.

9. At least one non-transitory computer-readable medium comprising a set of instructions that, in response to being executed by a processor circuit, cause the processor circuit to:
  determine two or more requisite resources to provide a product based on a request for the product from a user, the two or more requisite resources comprising at least one device and at least one skill;
  identify a location associated with the user based on the request for the product from the user;
  determine a set of candidate facilities to fulfill the request for the product based on the two or more requisite resources to provide the product requested by the user and the location associated with the user, wherein each candidate facility in the set of candidate facilities to fulfill the request for the product comprises each of the two or more requisite resources to provide the product requested by the user and satisfy a proximity threshold to the location associated with the user;
  compute a set of current resource utilizations for each candidate facility in the set of candidate facilities, the set of current resource utilizations computed based on status data that is automatically updated with data generated by one or more sensors at least one candidate facility in the set of candidate facilities, wherein the set of current resource utilizations for a respective candidate facility includes an availability of at least one of the two or more requisite resources to provide the product requested by the user;
  evaluate the set of current resource utilizations for each candidate facility in the set of candidate facilities with one or more machine learning models to determine a set of available facilities and an estimated completion time to fulfill the request for each available facility in the set of available facilities;
  determine one or more recommended facilities based on the set of available facilities and the estimated completion time to fulfill the request for each available facility in the set of available facilities; and
  provide the one or more recommended facilities as output.

10. The at least one non-transitory computer-readable medium of claim 9, comprising instructions that, in response to being executed by the processor circuit, cause the processor circuit to compute the set of current resource utilizations for a candidate facility in the set of candidate facilities based on one or more of a number of appointments at the candidate facility, a number of existing requests at the candidate facility, a number of scheduled activities for requisite resources at the candidate facility, a number of customers en route to the candidate facility, a size of a check in queue at the candidate facility, a number of vehicles in a parking lot of the candidate facility, and a number of navigation systems with the candidate facility as a destination.

11. The at least one non-transitory computer-readable medium of claim 9, comprising instructions that, in response to being executed by the processor circuit, cause the processor circuit to provide the one or more recommended facilities and the estimated completion time for each of the one or more recommended facilities as output, the output to cause a user interface to present the one or more recommended facilities and the estimated completion time for each of the one or more recommended facilities to the user for selection.

12. The at least one non-transitory computer-readable medium of claim 11, comprising instructions that, in response to being executed by the processor circuit, cause the processor circuit to:
  identify a selected facility from the set of recommended facilities based on input received via the user interface; and
  communicate the request for the product to the selected facility.

13. The at least one non-transitory computer-readable medium of claim 9, comprising instructions that, in response to being executed by the processor circuit, cause the processor circuit to determine one or more future staffing requirements for an available facility in the set of available facilities based on the set of current resource utilizations for the available facility in the set of available facilities.

14. The at least one non-transitory computer-readable medium of claim 9, the at least one device of the two or more requisite resources to provide the product requested by the user comprising one or more of a bank card encoder, a bank card blank, an automated teller machine, a certified check printer, and a safety deposit box.

15. The at least one non-transitory computer-readable medium of claim 9, the at least one skill of the two or more requisite resources to provide the product requested by the user comprising a training certification of an employee.

16. A computer-implemented method, comprising:
  identifying a request for a product from a user;
  determining two or more requisite resources to provide the product requested by the user, the two or more requisite resources comprising at least one device and at least one skill;
  identifying a location associated with the user based on the request for the product from the user;
  determining a set of candidate facilities to fulfill the request for the product based on the two or more requisite resources to provide the product requested by the user and the location associated with the user, wherein each candidate facility in the set of candidate facilities to fulfill the request for the product comprises each of the two or more requisite resources to provide the product requested by the user and satisfy a proximity threshold to the location associated with the user;
  computing a set of current resource utilizations for each candidate facility in the set of candidate facilities, the set of current resource utilizations computed based on status data that is automatically updated with data generated by one or more sensors at least one candidate facility in the set of candidate facilities, wherein the set of current resource utilizations for a respective candidate facility includes an availability of at least one of the two or more requisite resources to provide the product requested by the user;
  evaluating the set of current resource utilizations for each candidate facility in the set of candidate facilities with one or more machine learning models to determine a set of available facilities and an estimated completion time to fulfill the request for each available facility in the set of available facilities; and
  determining one or more recommended facilities to provide as output based on the set of available facilities and the estimated completion time to fulfill the request for each available facility in the set of available facilities.

17. The computer-implemented method of claim 16, comprising computing the set of current resource utilizations for a candidate facility in the set of candidate facilities based on one or more of a number of appointments at the candidate facility, a number of existing requests at the candidate facility, a number of scheduled activities for requisite resources at the candidate facility, a number of customers en route to the candidate facility, a size of a check in queue at the candidate facility, a number of vehicles in a parking lot of the candidate facility, and a number of navigation systems with the candidate facility as a destination.

18. The computer-implemented method of claim 16, comprising providing the one or more recommended facilities and the estimated completion time for each of the one or more recommended facilities as output, the output to cause a user interface to present the one or more recommended facilities and the estimated completion time for each of the one or more recommended facilities to the user for selection.

19. The computer-implemented method of claim 16, comprising determining one or more future staffing requirements for an available facility in the set of available facilities based on the set of current resource utilizations for the available facility in the set of available facilities.

20. The computer-implemented method of claim 16, comprising training the machine learning model on historical resource utilizations for one or more candidate facilities in the set of candidate facilities.

\* \* \* \* \*